Nov. 2, 1971    T. SZABO    3,616,490
MACHINE FOR BLOW MOLDING HOLLOW PLASTIC ARTICLES
Filed Jan. 21, 1969    2 Sheets-Sheet 1

INVENTOR.
TIBOR SZABO
BY
Edmund M Jaskiewicz
ATTORNEY

INVENTOR.
TIBOR SZABO

United States Patent Office 3,616,490
Patented Nov. 2, 1971

3,616,490
MACHINE FOR BLOW MOLDING HOLLOW
PLASTIC ARTICLES
Tibor Szabo, Heidenheim (Brenz), Germany, assignor to
Firma J. M. Voith GmbH, Heidenheim, Germany
Filed Jan. 21, 1969, Ser. No. 792,295
Claims priority, application Germany, Jan. 23, 1968,
P 17 04 374.2
Int. Cl. B29d 23/03
U.S. Cl. 18—5 BT        4 Claims

ABSTRACT OF THE DISCLOSURE

A blow molding machine has an extruder head with a vertically disposed nozzle for extruding a tubular parison of a thermo plastic synthetic material corresponding in length to the article to be molded. The extruded parison is gripped by a gripping and transfer arrangement which is pivotally mounted on the frame of the machine for pivotal movement in a horizontal plane. Two blow molding stations are each mounted on opposite sides of the machine. The vertical pivotal axis of the gripper and transfer mechanism is so positioned at the side of the extruder head directed toward the machine frame that pivotal movement of the gripper mechanism transfer the parisons from the extruder head to a blow molding station. The gripper mechanism comprises a pivot arm with a gripper on each side of the arm so that in the end positions of the gripper mechanism one gripper will be at the extruder head and the other gripper at a blow molding station.

---

The present invention relates to a machine for the blow molding of hollow plastic articles, more particularly, to a gripper and transfer mechanism for transferring extruded tubular parisons from the extruder head to a blow molding station.

Machines for the blow molding of hollow plastic articles, such as containers, receptacles and the like, generally comprise an extruder head having at least one vertically disposed nozzle from which is extruded a parison from a synthetic plastic material. Horizontally positioned from the extruder head and generally at an angle to the central vertical plane of the extruder there may be one or more blow molding stations. The number of blow molds will correspond to the number of extruding nozzles. A transfer mechanism operates to carry the extruded parisons into the open blow molds which are then closed so that the blow molding process may take place.

In these blow molding machines the extruder generally operates continuously so as to extrude continuously one or more parisons simultaneously but the blow molding station operates discontinuously. Further, the molded article must be cooled a definite period of time after the molding operation has been completed. In order to fully utilize the capacity of the extruder head as a rule two or more blow molds are arranged with respect to the extruder head.

Many forms of apparatus have been devised to transfer the severed parisons from the end of the extruder nozzles into the open blow mold. In one form of a blow molding machine the blow mold is positioned below the extruder head and either the extruder head or blow mold is mounted for vertical movement. During the relative movement between the blow mold and the extruder head a blow jet is inserted into the open end of the extruded parison now in the open mold. The mold is then closed. The extruded parison must be severed from the extruder head and the closed mold and extruder head moved away from each other as soon as possible so that the next succeeding parison can be extruded. This construction has the disadvantage in that for each cycle relatively great masses must be quickly accelerated and just as quickly decelerated to a stop. As a result, the construction of the blow molds with respect to the extruder head is a heavy and expensive one. Further considerable time is lost during the relative movement between the extruder head and the blow molds.

In another form of a blow molding machine a number of blow molding stations are mounted on a drum or disk which rotates in either a vertical or a horizontal plane. For each cycle, the drum is rotated to position a blow molding station under a fixed extruder head so that an extruder parison is positioned into the blow molding station, the parison severed, the blow molds closed and moved away from the extruder head to position a succeeding blow mold under the extruder head. In this form of machine also the relatively large mass of the rotatable drum and blow molding stations undergoes intermittent movement during each cycle and large forces are required to start and stop the drum in the proper positions. Furthermore, a control system must be provided to accurately position the rotatable drum and the necessity for such an accurate system adds considerably to the cost of the blow molding machine.

It was therefore proposed to construct a blow molding machine wherein both the extruder head and blow molding station were fixed and the extruded parisons were transferred from the extruder head to the open molds of the blow molding station. In one such form of a machine a gripper and transfer mechanism is provided which is vertically movable back and forth between the extruder head and the blow molds. In such a machine the mass of the component which is to be moved is relatively small but generally only one blow molding station is used. Where a number of blow molding stations are arranged in a horizontal plane the gripper and transfer mechanism may be so constructed so as to move in the proper sequence between the extruder head and the blow molding stations. However, with the increase in the number of blow molding stations the same problems are encountered as described above namely, the masses of the moving structures increase significantly and thus the construction of the machine becomes heavier and more expensive.

In still another known form of blow molding machines a rotatable disk having gripping means on the underside thereof is positioned outwardly of the machine frame upon which the extruder means with the extruder head is mounted with the edge of the disk being in the vicinity of the extruder head. Near the edge of the rotary disk there are a number of upwardly extending calibrating and blow rods. Generally in such a machine the extruder head is located between the machine frame and the rotational axis of the rotary disk. At a particular time when the blow rod is positioned vertically under the extruder head the rod penetrates into the opening of the plastic tube as it is being extruded. As soon as the necessary length of plastic tubing has been extruded, the extruded tube section or parison which is hanging from the extruder head will be gripped and severed at its upper end by the gripper mechanism. The rotary disk carrying the blow rod and the severed tubular section will make a circular movement until the tube section is positioned between the opened halves of a blow mold positioned above the edge of the rotary disk. With the same movement the gripper mechanism will be taken away from the plastic tube section. The apparatus is so constructed that the rotary movement of the disk will carry the next succeeding blow rod into a position vertically below the extruder head. When the blow mold is closed, the gripper mechanism must be swung back to the previous position in order to grip the next tubular section being extruded from the extruder head. After completing the blow cycle and the blow forms have opened the rotary disk turns further in the original sense until the next free blow rod is positioned under the extruder nozzle and the previously extruded tubular section has been brought from between the halves of the blow mold. This blow molding machine has the disadvantage that it requires an expensive construction together with a complicated switch control mechanism. Further there is practically no possibility of positioning the extruder to more than one blow mold. In the meantime the extruder head is relatively inaccessible because of the arrangement of the rotary disk with the blow molds and blow rods and the space occupied by the machine is relatively great.

It is therefore the principal object of the present invention to provide a novel and improved blow molding machine having relatively fixed extruder head and blow molding stations.

It is another object of the present invention to provide a simplified and reliable gripper and transfer mechanism for a blow molding machine wherein the extruded parisons are moved from the extruder head to a blow molding station.

It is an additional object of the present invention to provide a blow molding machine which is relatively simple in construction but has a high rate of production and occupies a minimum of space.

In one aspect of the present invention there is disclosed a machine for the blow molding of hollow plastic articles having a supporting frame upon which is mounted an extruder having an extruder head with at least one vertical nozzle for extruding a tubular parison of synthetic plastic. Blow molding station means are horizontally spaced from the extruder head with the central vertical plane of the blow molding station being at an angle to the central vertical plane of the extruder means. The blow molding station comprises a number of blow molds corresponding in number to the number of extruding nozzles in the extruder head. Pivotally mounted on the machine frame is a mechanism for gripping and transferring an extruded parison from the nozzle to the blow molding station means. The pivot axis of the gripping and transferring mechanism is vertical so that the mechanism pivots in a horizontal plane and is located at the intersection of the central vertical planes of the blow molding station and the extruder means. The intersection of these central vertical planes is located at the side of the extruder head toward the frame of the machine. Two blow molding stations may be provided each located on one side of the extruder with both blow molding stations being at the same angle to the central vertical plane of the extruder means.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment of the present invention will be described in detail.

Figure 1:
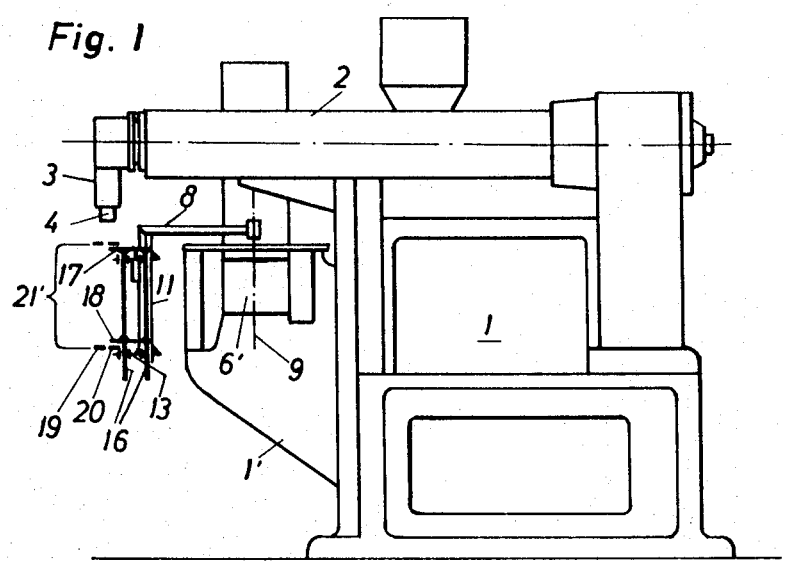
FIG. 1 is a schematic drawing of a side elevational view of the blow molding machine according to the present invention.

As may be seen in FIG. 1 the blow molding machine of the present invention comprises a frame 1 upon which is mounted an extruder 2 having an extruder head 3 provided with four extruding nozzles 4 so that four tubular sections or parisons may be extruded simultaneously. The extruder may be movably mounted on the frame so as to facilitate replacing, adjusting or servicing of the extruder head. The extruder is intended for continuous extrusion. The control mechanism for the extruder 2 and the hydraulic components for the entire machine are mounted on the frame 1.

The frame 1 is provided with an extending frame portion 1', two blow molding stations 6 and 6' with each blow molding station comprising four blow molds 7. These blow molding stations are mounted on both sides of the central vertical plane of the extruder indicated at 5. The four blow molds correspond to the four extrusion nozzles 4.

A pivot arm 8 is pivotally mounted at a vertical pivotal axis 9 for pivotal movement in a horizontal plane. The pivotal axis 9 is located at the intersection of the central vertical plane 5 of the extruder and of the central vertical planes 10 and 10' of the blow molding stations 6 and 6' respectively. The pivotal connection of pivot arm 8 is on the frame portion 1'.

Figure 2:
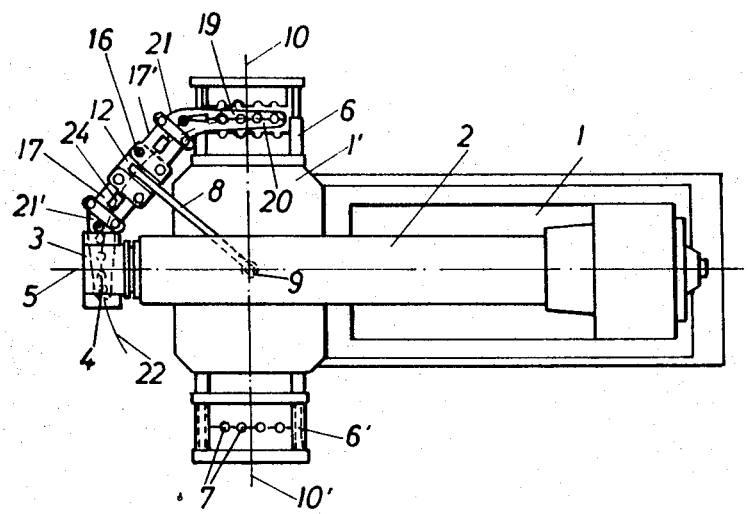
FIG. 2 is a schematic drawing of a top plan view of the machine of FIG. 1 and showing the two blow molding stations.
Figure 3:
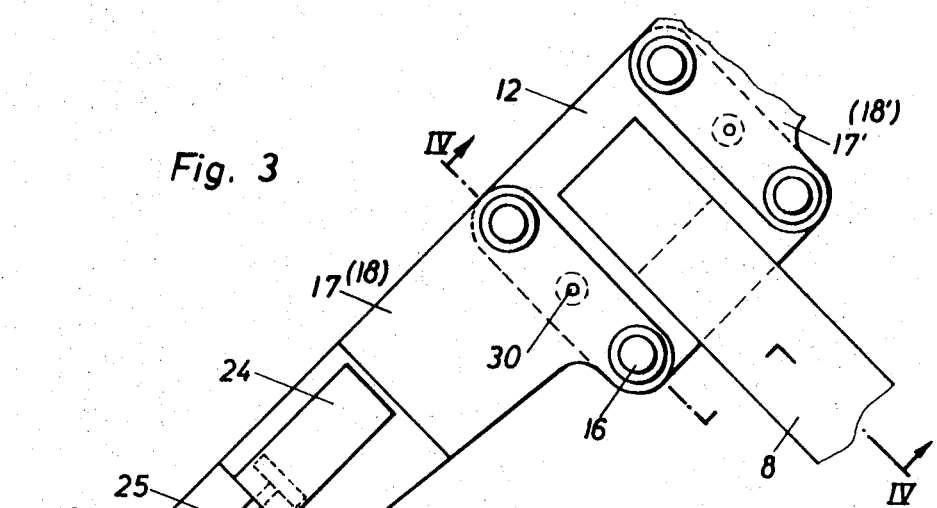
FIG. 3 is a top plan view in enlarged scale of the gripper mechanism by which an extruded parison is seized and transferred to a working station.

At the free end of the pivot arm 8 there is a downwardly extending carrier arm 11 upon which are mounted vertically spaced mounting plates 12 and 13 which extend on both sides of the pivot arm. The mounting plates 12 and 13 have pairs of openings therein in which are mounted tubular guides 14 and 15 respectively as may be seen in FIG. 4. Rods 16 are positioned in the tubular guides 14 and 15 for longitudinal movement therein in a vertical direction. Mounted on the rods 16 are upper and lower carrier arms 17 and 18 which extend horizontally from pivot arm 8 and are perpendicular thereto as may be seen in FIG. 3. On the free end of each of the supporting arms 17 and 18 is mounted a gripper comprising gripper halves 19 and 20. The gripper halves thus comprise gripper pairs 21 and 21' as seen in FIGS. 1 and 2. A gripper pair is thus positioned on each side of pivot arm 8 as may be seen in FIG. 2. The gripper pair 21' is mounted on the carrier arms 17' and 18' portions of which are illustrated in FIG. 3. As may be seen in FIG. 2 the extending carrier arms 17 and 18 and 17' and 18' together with their respective grippers form portions of a polygon which corresponds to the pivot path of the grippers as indicated at 22.

The gripper halves 19 and 20 are pivotally connected at 23 the axis of which is perpendicular with respect to the carrier arms 17 and 18. The opening and closing of the gripper halves 19 and 20 is accomplished by a hydraulic cylinder 24 having a piston 25 pivotally connected at its end by links 27 whose outer ends are pivotally connected to lever portions 26 of the gripper halves.

The lower carrier arm 18 is secured on the rod 16 by set screws 28 so that the distance between the upper and lower grippers may be adjusted to correspond to the length of the extruded tubular sections after they have been severed.

Figure 4:
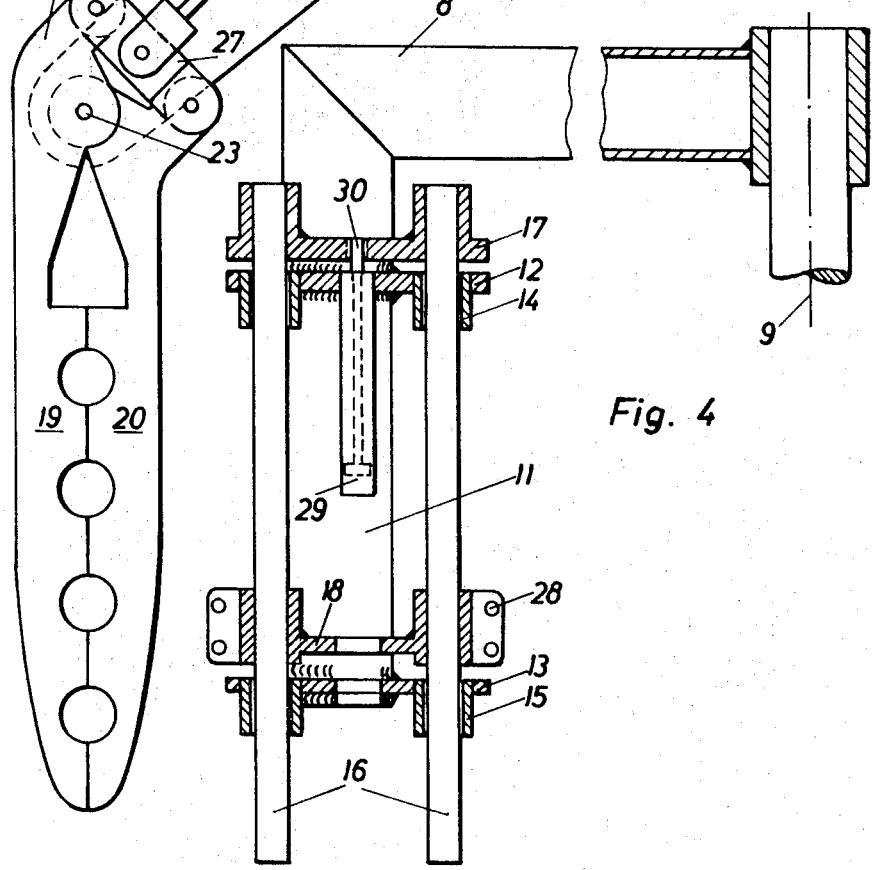
FIG. 4 is a sectional view taken along the line IV—IV of FIG. 3.

On the depending arm 11 there is mounted a hydraulic cylinder 29 whose piston rod 30 is connected to the upper carrier arm 17 as may be seen in FIG. 4. The actuation of the hydraulic cylinders 29 will cause a vertical movement of the respective gripper pairs 21 and 21' so that a continuous extrusion is made possible during the pivot operation. A known control system is provided to periodically move a gripper pair 21 to the blow molding station 6 while at the same time the gripper pair 21' is moved from the blow molding station 6' to the extruder head 3.

It is apparent that the blow molding machine disclosed herein can be constructed with one or two blow molding stations. The machine with two blow molding stations is characterized by the central vertical planes of the blow molding stations forming equal angles with the central vertical plane of the extruder means. In FIG. 2 the pivot arm 8 and the entire gripper and transfer mechanism is shown in one end position and in this end position the pivot arm 8 is located between the central vertical plane 5 of the extruder and the central vertical plane 10 of a blow molding station. In its other end position the pivot arm 8 is positioned between the central vertical plane 5 of the extruder and the central vertical plane 10' of the second blow molding station. It is thus apparent that the pivotal movement of the pivot arm and hence of the entire gripper and transfer mechanism is quite small and limited to movements between these two end positions.

As it may be seen from FIG. 2 the carrier arms extending at right angles from the pivot arm 8 together with their respective grippers form a portion of a polygon which corresponds to the pivot path of the mechanism as indicated at 22.

The control mechanism for timing the movement of the pivot arm, for actuating the grippers, for vertically moving the grippers, and for opening and closing of the blow molds is known in the art and need not be described in detail in the present application. While it is noted that the blow molding stations are positioned horizontally from the extruder head there is a small vertical spacing between the extruder head and the blow molding stations. This difference is compensated for by the vertical movement of the gripper pairs under the action of the hydraulic cylinder 29 as previously described. Thus when the gripper pair 21 swings into the position as shown in FIG. 2 the gripper pair is lowered so that the parisons are positioned within the open blow mold. Upon positioning of the parisons in the blow mold the gripper halves are opened to release the parisons and a jet of air or other suitable fluid under pressure is injected into the parison within the blow mold in a known manner to mold the parison to the shape of the mold. Upon release of the parisons from the grippers the pivot arm will swing to its other position so that the grippers may seize the parisons which are being extruded from the nozzles 4. As pointed out above, the extrusion of the parison occurs continuously and the movement of the gripper and transfer mechanism is timed so that parisons of the correct length are seized within the grippers and severed from the extruder nozzles.

It will be understood that this invention is subject to modification in order to adapt it to different uses and conditions and, accordingly, it is desired to comprehend such modification within this invention as may fall within the scope of the appended claims.

I claim:

1. In a machine for the blow molding of hollow plastic articles, the combination of a supporting frame, a substantially horizontally disposed extruder head with at least one vertical nozzle for extruding a tubular parison therefrom, blow molding station means horizontally spaced from said extruder head with the central vertical plane of said blow molding station means being at an angle to the central vertical plane of said extruder means, said extruder means and said blow molding station means being both mounted on said frame portion, each blow molding station means having a number of blow molds corresponding to the number of said extruding nozzles, means pivotally mounted on said machine frame for gripping and transferring an extruded parison from the extruder nozzle to the blow molding station means, the pivot axis of said gripping and transferring means being vertical and located at the intersection of the central vertical planes off said blow molding station means and said extruder means, the inter-section of said central vertical planes being located at the side of the extruder head facing the extruder means.

2. In a machine as claimed in claim 1 with there being two blow molding stations each secured to one side of the frame of the machine, both blow molding stations being at the same angle to the central vertical plane of the extruder means in the vertical cylindrical area defined by the path of the gripping means, said gripping and transferring means comprising a pivot arm pivotally mounted on said frame, on each side of said pivot arm at least one gripper, each gripper facing away from the pivot arm, the parting line of each gripper extending substantially tangentially to its circular path, said grippers being so arranged on said pivot arm that when the pivot arm is in an end position one gripper is positioned at the extruder head and the other gripper at a blow molding station.

3. In a machine as claimed in claim 2 with grippers each comprising a pair of cooperating gripping elements and mounted on carrier members projecting laterally at the end of the pivot arm, said carrier members and gripping members forming a portion of a polygon corresponding to the curvature of the pivot path of the grippers.

4. In a machine as claimed in claim 2 and comprising means on said gripper means for positioning vertically said gripper elements.

References Cited

UNITED STATES PATENTS

| | | | |
|---|---|---|---|
| 2,692,693 | 10/1954 | Newburg | 214—1 B.3 |
| 3,204,018 | 8/1965 | Hagen | 18—5 BT |
| 3,243,847 | 8/1965 | Fogelberg et al. | 18—5 BT |

FOREIGN PATENTS

| | | | |
|---|---|---|---|
| 1,170,301 | 9/1958 | France | 18—5 B |

J. SPENCER OVERHOLSER, Primary Examiner

D. S. SAFRAN, Assistant Examiner

U.S. Cl. X.R.

18—5 BP